United States Patent [19]  
Hopkins

[11] 3,938,626  
[45] Feb. 17, 1976

[54] VIBRATION DAMPING ASSEMBLY
[75] Inventor: David Alan Hopkins, Detroit, Mich.
[73] Assignee: The Valeron Corporation, Detroit, Mich.
[22] Filed: Sept. 3, 1974
[21] Appl. No.: 502,365

[52] U.S. Cl. .................................. 188/1 B; 408/143
[51] Int. Cl.² ............................................. F16F 7/10
[58] Field of Search ....................... 188/1 B; 408/143

[56] References Cited  
UNITED STATES PATENTS

| | | | |
|---|---|---|---|
| 2,028,930 | 1/1936 | Taylor | 188/1 B UX |
| 2,302,670 | 11/1942 | Buchanan | 188/1 B X |
| 3,207,009 | 9/1965 | Carlstedt | 188/1 BU X |
| 3,774,730 | 11/1973 | Maddux | 188/1 B |

FOREIGN PATENTS OR APPLICATIONS

| | | | |
|---|---|---|---|
| 515,318 | 12/1939 | United Kingdom | 188/1 B |

Primary Examiner—Duane A. Reger  
Attorney, Agent, or Firm—Farley, Forster and Farley

[57] ABSTRACT

The vibration damping construction for boring bars comprising a cutter insert holder bar cap rigidly mounted on the end of a boring bar having a rigidly anchored cantilevered internal bar extending back within a cylindrical cavity in the end of the boring bar on which an optional number of heavy reactors are assembled with optionally varied radial clearance for relative oscillatory movement, as well as axial clearance for free independent movement and with outer radial clearance relative to the inner wall of the boring bar exceeding the maximum oscillatory movement whereby reactive oscillatory damping impact transmitted to the cantilevered inner bar will in turn be transmitted to the anchor point of the inner bar and thereby concentrated near the axial location of the cutter insert. A progressive series of reactors with progressive inner radial clearance effectively simultaneously dampen vibrations of different frequency; and various modifications provide optional and adjustable cantilevered reactor assemblies adapted to meet specific requirements.

20 Claims, 8 Drawing Figures

VIBRATION DAMPING ASSEMBLY

BACKGROUND OF THE INVENTION

The art of reactor damping of vibratory chattering such as induced by single cutting point boring bars of extensive length is illustrated by applicant's prior application, Ser. No. 379,438, as well as prior U.S. Pat. Nos. 3,207,009; 2,591,115; 3,598,498; and 3,642,378. It is typical of all such prior art to transmit the damping impact in a radial direction transverse to the axis of the boring bar to the surrounding wall of the boring bar either directly or through a viscous fluid occupying the clearance space.

SUMMARY OF THE INVENTION:

The present invention departs from the prior art in providing a cantilevered inner bar anchored in the insert holder bar cap preferably adjacent the axial location of the cutting action as a means of amplifying the leverage of damping impact as well as concentrating its effective point of application at or near the axial location of the anchor point adjacent the cutting action. This, together with the provision of coordinated series of progressive radial clearances in the successively stacked reactors has been found to provide extremely effective damping action and permit unprecedented unsupported length of boring bar combined with greater depth of cut with smooth accurate surface finish. Optional and adjustable features accommodate a wide range of damping frequencies to meet particular requirements.

Figure 1:
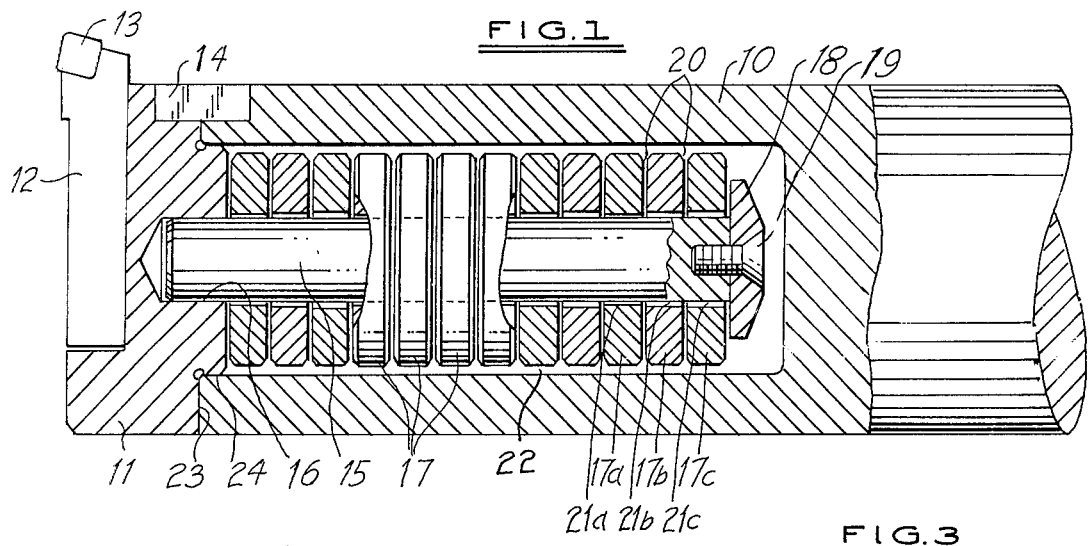
FIG. 1 is a fragmentary sectional side elevation of the outer end of a boring bar with a boring head having vibration damping means mounted thereon.

DESCRIPTION OF THE PREFERRED EMBODIMENTS:

Referring to FIG. 1 the outer end of a boring bar 10 is provided with a bar cap 11 having the insert holder installed therein by conventional means (not shown) for a conventional indexable carbide or other wear resistant insert 13 with a drive 14 provided between the bar cap and boring bar. An inner bar 15, preferably heat treated to spring hardness (38/42 Rc), is press fit in a cylindrical pocket 16 in the bar cap on which are mounted a plurality of vibration damping discs 17 made of a heavy impact resistant material such as Mallory which are retained on the inner bar by an assembly washer 18 and socket screw 19 with the inner bar 15 length dimensioned to provide a slight axial clearance 20 assuring freedom of independent radial movement without frictional interface engagement which would inhibit radial movement.

A series of successive discs such as 17a, 17b, 17c may be provided with progressively different inner diameters providing successive varying clearances 21a, 21b, 21c, each of which is preferably less than the clearance 22 between the outer diameters of the discs and adjacent wall of the cylindrically recessed end of the boring bar.

This construction together with a shoulder engagement 23 of the bar cap and press fit at 24 in rigid relationship with the boring bar results in a cantilevered suspension of the vibration damping discs amplifying their reactive impact and concentrating their damping effectiveness in the bar cap in close proximity to the cutting action forming the source of potential vibration.

The progressive of increasing clearances in groups of three, starting at the bar cap end of the assembly, will be understood to effectively oppose and dampen vibrations of progressively increasing amplitude and decreasing frequency as between the individual discs in a set of three and by repeating such succession of groups of discs at progressively greater distance from the anchor point of the cantilever inner bar suspension, the progressively greater amplitude of transmitted vibrations and leverage of resistance thereto by the inertia impact between inner bar and damping discs provides an unusual range of effectiveness in providing steady substantially vibrationless boring action in terms of the permissable length of overhang and possible depth of chatter free cut in the boring action.

Figure 2:
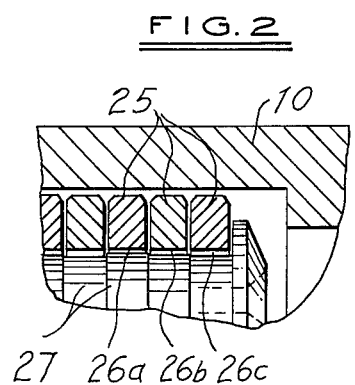
FIG. 2 is a fragmentary sectional view of a modification of the damping unit of FIG. 1.
Figure 4:
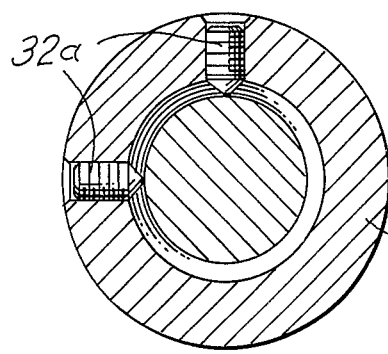
FIG. 4 is a sectional view taken along the line 4—4 of FIG. 3; drive key

With reference to FIG. 2 as an alternative to the progressively staggered clearances between the inner bar and reactor discs provided by different inner disc diameters, a similar action may be provided utilizing identical discs 25 with progressive clearances 26a, 26b and 26c provided by progressively stepped diameters 27 on the inner bar.

Figure 3:
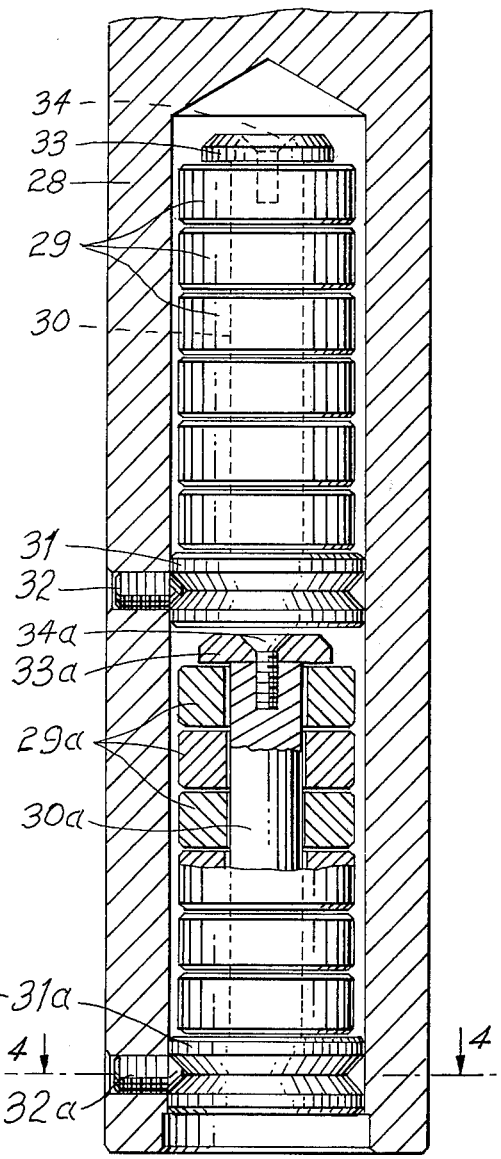
FIG. 3 is a fragmentary sectional view of the lower end of a vertical boring bar with a modified version of the vibration damping unit.

With reference to FIG. 3 the construction shown is particularly adapted for use in vertical boring bars such as 28 wherein groups of damping discs 29 having progressive clearances as in the case of FIG. 1 are mounted on a vertical reaction bar 30 having a grooved head 31 anchored against the inner wall of the bar by a pair of set screws 32 with the damping discs freely retained with axial clearance by an assembly washer 33 and socket screw 34 as in the case in FIG. 1; and a second like assembly of damping discs 29a mounted on bar 30a with head 31a secured by set screws 32a and retained by washer 33a and screw 34a. This double reactor assembly assures that inter-face friction between successive discs arising from accumulative gravity is limited to the stack assembled on a single headed bar and that each stack will act independently to provide a cantilevered reaction to vibration of the boring bar at the respective anchoring points of the heads 31 and 31a. Further subdivision of contiguous discs is possible, as by spacer washers secured to the inner bar (not shown), and anti-friction plastic washers or coating may also be applied to disc faces to promote freely independent action. Particularly in the case of vertical boring bars for making heavy cuts requiring heavy reactor discs it is preferably to limit the number of stacked contiguous discs. For example, in the case of the embodiment of FIG. 3 a spacer washer secured to the inner bar under the top three discs of each assembly would so limit build up of frictional contact pressure.

Figure 5:
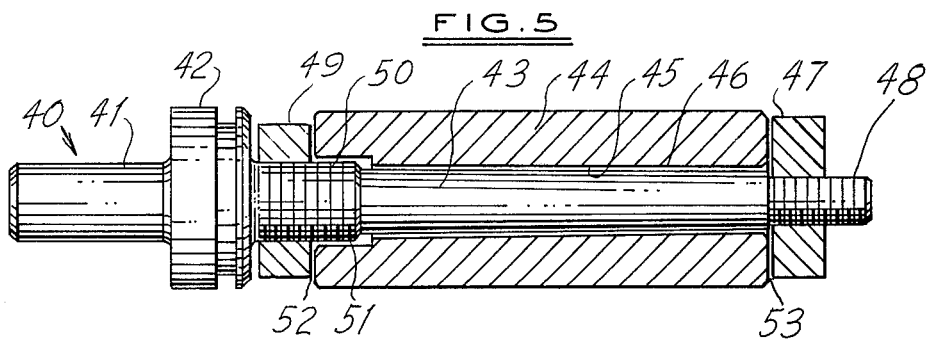
FIG. 5 is a sectional side elevation of a modified vibration damping unit.

With reference to FIG. 5 an alternative form of cantilevered reaction vibration damping unit is shown utilizing a one-piece reactor with tapered through hole adjustably related to a tapered reaction bar mounting. Thus, an internal bar unit 40 having a cylindrical extension 41 adapted for rigid engagement with a suitable insert holder bar cap or nose mounting has an annulus 42 providing an inner bar pilot contact surface for transmitting the reactive forces to the bar. An axially tapered inner bar 43 matching the tapered through hole in the one-piece reactor 44 provides an adjustable clearance between the adjacent reactor surface 45 and bar surface 46 through the adjustment of a split clamp 47 with threaded I.D. on the threaded end 48 of the bar and a cooperating clamp 49 engaging a threaded portion 50 extending within a recess 51 in the reactor 44. Through the limited adjustment of the clamps 47–49 while maintaining axial clearance 52 and 53 at the respective ends of the reactor, a limited variable radial clearance as well as axial positioning of the reactor is made possible. Thus an inner bar taper the same as a standard tapered pin reamer having a ¼ inch taper per foot, a ¼ axial adjustment will change the oscillating clearance from .0005 inch minimum to .005 inch maximum oscillating clearance thereby providing a construction for effectively damping a broad range of chatter frequencies.

Figure 6:
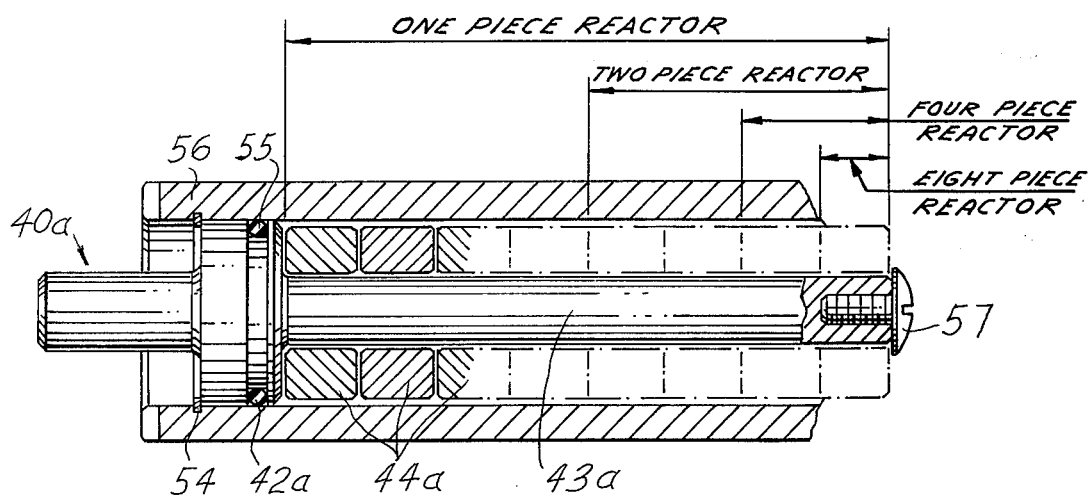
FIG. 6 is a sectional side elevation of a further modified vibration damping unit as installed in the outer end of the boring bar.

With additional reference to FIG. 6 a similar reaction bar is shown in installed relation in a boring bar 56 with annulus 42a retained by snap ring 54 and sealed by O-ring 55 providing a pilot cantilever mounting for the bar 48 with an insert nose mounting (not shown) piloted within the end of the boring bar completing the cantilever suspension of the reaction bar 43a. Optional one-piece, two-piece, four-piece or eight-piece reactors, or any combination thereof are contemplated to be retained with axial clearance by headed screw 57 in order to provide a variable damping effect by substituting one, two or other multiple reactors to meet the particular requirements for minimizing chatter under particular operating conditions.

Figure 7:
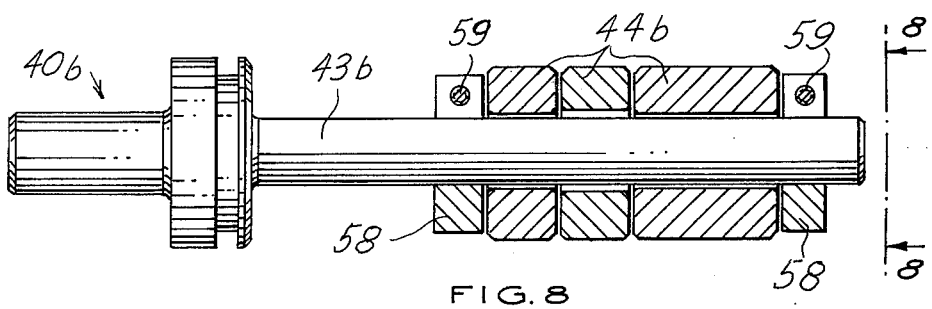
FIG. 7 is a further modified vibration damping unit for similar installation.
Figure 8:
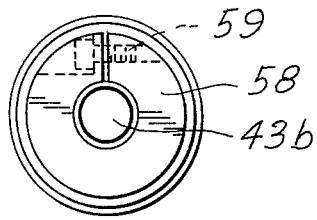
FIG. 8 is an end view taken along the line 8—8 of FIG. 7.

With reference to FIG. 7, still another optional form of a cantilever inner bar unit 40b having a uniform cylindrical bar 43b for mounting any of a variety of reactors 44b between like adjustable clamps 58 secured by clamp screws 59. The Figure shows only one of a wide variety of combinations possible for one or more reactors of equal or unequal oscillating clearance and width located at various distances from the supported end of the inner bar. Thus, a range of one reactor of various lengths and oscillating clearances up to the full length of the bar may be divided into two or more reactor components on the full bar length and by this broad selection of reactor components in regard to individual or combined weight and oscillating clearances, it is possible to effectively dampen vibration chatter to extremely fine values.

Tests have shown that through use of the cantilever construction disclosed herein for amplifying the effectiveness of reactive vibration damping impact and concentrating its application to an axial location adjacent the cutting action, longer boring bar overhangs are possible, e.g., of a length 10 times the diameter - under conditions where the cutting insert would otherwise be completely destroyed in the initial cutting action.

With the mass located on the boring bar axis, the construction is suitable for rotating applications without centrifugal imbalance. The construction has flexibility for adaptation to a variety of uses and machining conditions. Additional reactor assemblies can be readily added in an extended bore to control chatter conditions which turn out to be worse than expected. The advantages are especially applicable to long, large diameter specially designed boring bars.

I claim:

1. Tool vibration damping means for a tool, such as a boring bar, having a longitudinal extension subject to cutting action induced vibration, characterized by a longitudinally extending internal reaction member with means for rigid cantilever mounting within and to said extension, and reactor means mounted on said member with transverse clearance relative thereto and greater transverse clearance relative to the surrounding wall of said tool extension, whereby oscillatory vibration damping impact between said reactor means and said reaction member will be imparted to and concentrated at said cantilever mounting.

2. The vibration damping means of claim 1 including means adapted for location of said cantilever mounting longitudinally adjacent the cutting action.

3. The vibration damping means of claim 2 including plural reactors having longitudinal clearance therebetween providing independent freedom of transverse oscillatory impact.

4. The vibration damping means of claim 3 including different transverse clearances between different of said plural reactors and said reaction member.

5. The vibration damping means of claim 4 including a progressive ordered series of different clearances.

6. The vibration damping means of claim 4 including a progressive ordered series of different clearances beginning with the smallest clearance in the reactor immediately adjacent said cantilever mounting.

7. The vibration damping means of claim 4 including a progressive ordered series of different clearances beginning with the smallest clearance in the reactor immediately adjacent said cantilever mounting, said progressive series of clearances being repeated in successive groups of reactors.

8. The vibration damping means of claim 4 wherein said different clearances are provided by different internal dimensions in said reactors.

9. The vibration damping means of claim 4 wherein said different clearances are provided by stepped different external dimensions on said reaction member.

10. The vibration damping means of claim 3 including means for isolating groups of reactors whereby the frictional resistance to independent transverse oscillatory reaction incident to the cumulative weight of a stack of reactors where the tool is used in a vertical longitudinal direction may be limited to a predetermined number without limiting the total number of reactors employed.

11. The vibration damping means of claim 10 wherein said means includes a plurality of isolated rigid cantilever mountings.

12. The vibration damping means of claim 10 wherein said means includes a plurality of isolated rigid cantilever mountings, each mounting comprising a head rigidly associated with said reaction member, and means for rigidly securing said head relative to the surrounding wall of said tool.

13. The vibration damping means of claim 10 wherein said means includes a plurality of isolated rigid cantilever mountings, each mounting comprising a head rigidly associated with said reaction member, and means for rigidly securing said head relative to the surrounding wall of said tool, said last means including a circumferential groove in said head and a plurality of set screws extending through the adjacent wall of said tool for forcing said head into rigid assembled relation with the surrounding wall of said tool.

14. The vibration damping means of claim 1 wherein said reaction member and reactor means are provided with longitudinal matching tapers and longitudinal adjustment means for varying their relative longitudinal positions and thereby varying the effective transverse clearance therebetween.

15. The vibration damping means of claim 14 wherein said reactor means comprises a single longitudinally extending solid reactor.

16. The vibration damping means of claim 1 wherein said rigid cantilever mounting includes a cutter holding cap adapted for rigid assembly at the end of said tool with a rigid cantilever mounting between said cap and reaction member.

17. The vibration damping means of claim 1 wherein said reaction member is provided with a radially extending annulus adapted to provide reactive force transmitting pilot engagement within a cylindrical wall of the tool.

18. The vibration damping means of claim 1 wherein said reaction member is provided with a fixed length adapted for mounting an optional number of reactors totally occupying the length of said reaction member with longitudinal clearance therebetween, and including plural reactors mounted thereon having a fractional length relationship with said fixed total length.

19. The vibration damping means of claim 1 wherein said reaction member has a fixed total length of uniform cross section, and slidable end clamp means on said reaction member for locating an optional number of reactors at an optional position along the length of said reaction member to adjustably vary the effective damping action to meet specific requirements of use.

20. The vibration damping means of claim 1 installed in the end of a cylindrical boring bar having a cylindrical cavity with total operational clearance relative to a stack of cylindrical disc reactors mounted on said reaction member.

* * * * *

UNITED STATES PATENT AND TRADEMARK OFFICE
CERTIFICATE OF CORRECTION

PATENT NO. : 3,938,626
DATED : February 17, 1976
INVENTOR(S) : DAVID ALAN HOPKINS It is certified that error appears in the above-identified patent and that said Letters Patent are hereby corrected as shown below:

Col. 1, line 44, after "Fig. 3", the words "drive Key" are deleted

Col. 1, line 61, after "drive" the word --key-- is inserted

Signed and Sealed this

Fourth Day of January 1977

[SEAL]

Attest:

RUTH C. MASON
*Attesting Officer*

C. MARSHALL DANN
*Commissioner of Patents and Trademarks*